United States Patent [19]
Schnaibel et al.

[11] Patent Number: 5,647,668
[45] Date of Patent: Jul. 15, 1997

[54] METHOD FOR GENERATING A SIGNAL RELATING TO A TEMPERATURE IN THE EXHAUST SYSTEM OF AN INTERNAL COMBUSTION ENGINE

[75] Inventors: Eberhard Schnaibel, Hemmingen; Erich Schneider, Kirchheim; Hong Zhang, Schwieberdingen, all of Germany

[73] Assignee: Robert Bosch GmbH, Stuttgart, Germany

[21] Appl. No.: 474,433

[22] Filed: Jun. 7, 1995

[30] Foreign Application Priority Data

Sep. 21, 1994 [DE] Germany .................. 44 33 631.4

[51] Int. Cl.[6] ........................................... G01K 13/02
[52] U.S. Cl. .................. 374/144; 123/198 D; 364/557; 364/581
[58] Field of Search ................. 374/144; 123/198 D; 364/557, 581

[56] References Cited

U.S. PATENT DOCUMENTS

| | | | |
|---|---|---|---|
| 3,990,308 | 11/1976 | McCormick et al. | 374/144 |
| 4,178,798 | 12/1979 | Wessel | 374/144 |
| 4,442,424 | 4/1984 | Shirasaki et al. | 374/144 |
| 5,255,511 | 10/1993 | Maus et al. | 374/144 |

FOREIGN PATENT DOCUMENTS

| | | | |
|---|---|---|---|
| 970593 | 7/1975 | Canada | 374/144 |
| 963037 | 6/1950 | France | 374/144 |
| 2277235 | 1/1976 | France | 374/144 |
| 43 38 342 | 5/1995 | Germany . | |
| 44 24 811 | 1/1996 | Germany . | |

*Primary Examiner*—Diego F. F. Gutierrez
*Attorney, Agent, or Firm*—Kenyon & Kenyon

[57] ABSTRACT

A method and device for forming a signal relating to a temperature in the exhaust system of an internal combustion engine. The method can be used, for example, to form a signal for the exhaust gas temperature upstream of the catalytic converter, a signal for the temperature in the catalytic converter, or a signal for the temperature downstream of the catalytic converter. The first step is to form a signal for a steady-state exhaust gas temperature as a function of at least one operating characteristic of the internal combustion engine. This signal can be subjected to a series of corrections in order to take into account parameters such as the efficiency of the internal combustion engine, the air/fuel ratio, the temperature of the intake air, the mixture flow rate, the vehicle speed, a possibly activated cylinder cutout, and the presence of condensed water in the exhaust system.

9 Claims, 6 Drawing Sheets

METHOD FOR GENERATING A SIGNAL RELATING TO A TEMPERATURE IN THE EXHAUST SYSTEM OF AN INTERNAL COMBUSTION ENGINE

FIELD OF THE INVENTION

The present invention relates to a method for generating a signal relating to a temperature in the exhaust system of an internal combustion engine.

BACKGROUND INFORMATION

German Application No. DE 43 38 342, not published prior to the date of filing of the present application, describes a method and a device for generating a simulated signal relating to the temperature of the exhaust gas, of the exhaust-gas probe, or of the catalytic converter. The known method determines a steady-state exhaust gas temperature with the aid of a characteristic curve. The time variation of the exhaust gas temperature upstream of the catalytic converter is simulated with the aid of a first filter, starting from the steady-state exhaust gas temperature. The temperature of the catalytic converter can further be determined with the aid of a second filter.

Furthermore, it is described in German Patent Application No. DE 44 24 811, likewise not published prior to the date of filing of the present application, when simulating the time variation of the exhaust gas temperature, starting from the steady-state exhaust gas temperature, to undertake a division into a fast and a slow component. The two components are further processed separately and subsequently superimposed again. Provision is made, furthermore, for using a correction factor to take account of cooling of the exhaust gases, which is a function of driving speed.

It is the object of the present invention to generate a signal which reproduces as accurately as possible a temperature in the exhaust system of an internal combustion engine.

Summary Of The Invention

The method according to the present invention provides that when forming the signal for the temperature in the exhaust system, account is taken of additional operating characteristics, not previously taken into account in conventional systems, with the result that it is possible overall to achieve higher accuracy. Moreover, in the method according to the present invention, it is also possible to take account of operating situations which occur only from time to time such as, for example, the interruption of the fuel metering to individual cylinders, which can be caused, inter alia, during traction-slip control. As additional operating characteristics, the method according to the present invention can take account of, for example, data on the efficiency of the internal combustion engine, data on the air/fuel mixture, data on the temperature of the air taken in by the internal combustion engine, or data on the number of the cylinders cut out.

The method according to the present invention has the advantage that, under many different operating conditions of the internal combustion engine, it generates a signal which represents the temperature in the exhaust system of the internal combustion engine with good accuracy. In order to generate the signal relating to the temperature in the exhaust system of the internal combustion engine, a first signal is formed starting from at least one operating characteristic of the internal combustion engine. This first signal is influenced by a correction signal, which is a function of a signal which is related to the efficiency of the internal combustion engine, and/or of a signal which specifies the temperature of the air taken in by the internal combustion engine.

Moreover, the correction signal may also be a function of a signal which specifies the air/fuel ratio of the mixture taken in by the internal combustion engine, and/or of a signal which specifies the mixture flow rate through the internal combustion engine.

A further advantage of the present invention is that, in the generation of the signal relating to the temperature in the exhaust system of the internal combustion engine, account can be taken of a signal which is related to the number of the cylinders cut out by the fuel metering.

DETAILED DESCRIPTION OF THE INVENTION

Figure 1:
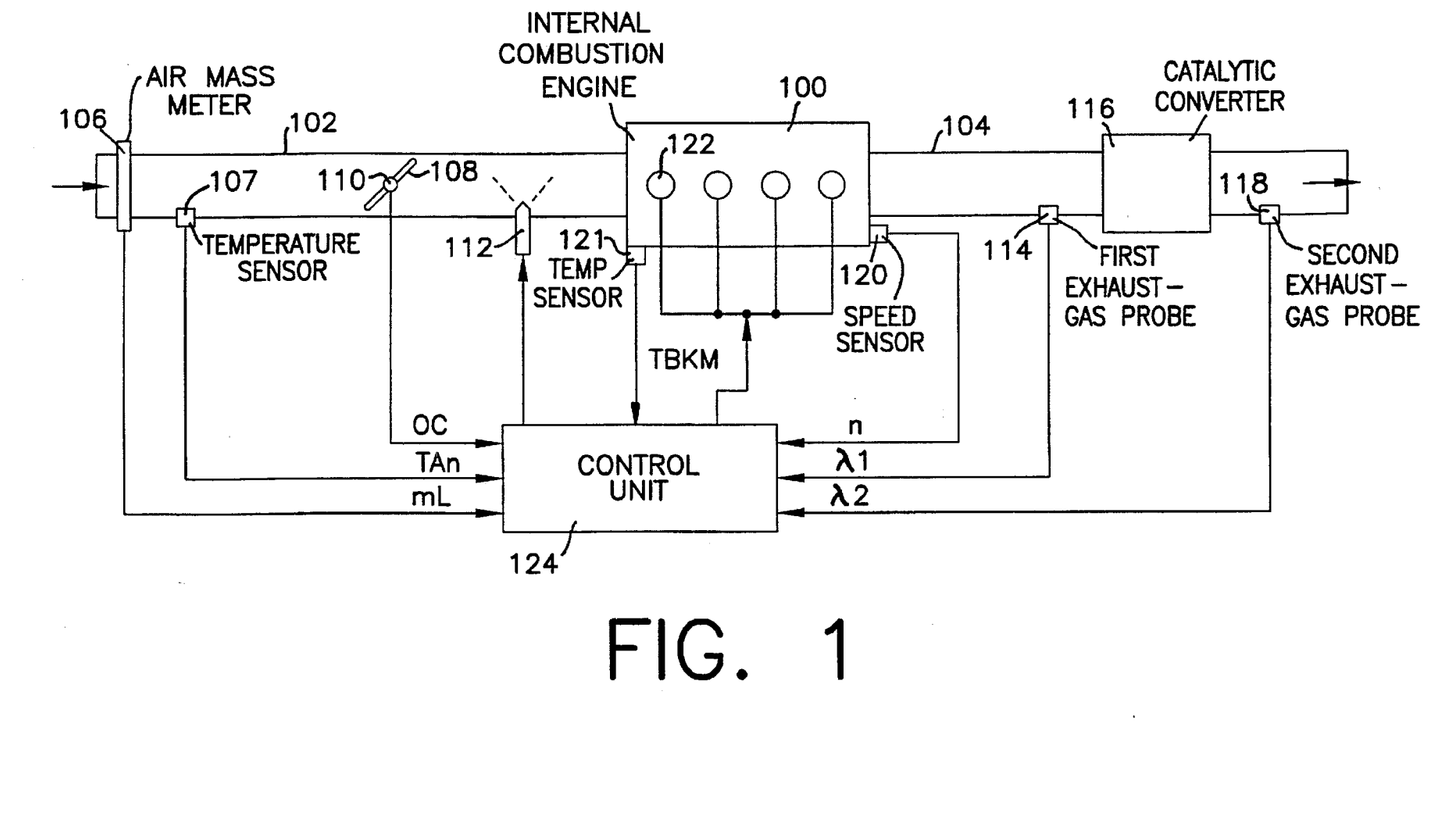
FIG. 1 shows an internal combustion engine and exhaust system in which the method and device according to the present invention can be used.

FIG. 1 shows the technical field in which the present invention can be used. An internal combustion engine 100 is fed an air/fuel mixture via an intake tract 102, and the exhaust gases are discharged into an exhaust duct 104. Seen in the direction of flow of the intake air, an air-flow sensor or air mass meter 106, for example, a hot film air mass meter, a temperature sensor 107, a throttle valve 108 having a sensor 110 for detecting the opening angle of the throttle valve 108, and at least one injection nozzle 112 are fitted in the intake tract 102. Seen in the direction of flow of the exhaust gas, a first exhaust-gas probe 114, a catalytic converter 116 and a second exhaust-gas probe 118 are arranged in the exhaust duct 104. A speed sensor 120 and a temperature sensor 121 are fitted into the internal combustion engine 100. Furthermore, the internal combustion engine 100 has, for example, four spark plugs 122 for igniting the air/fuel mixture in the cylinders.

The output signals mL of the air-flow sensor or air mass meter 106, TAn of the temperature sensor 107, α of the sensor 110 for detecting the opening angle of the throttle valve 108, λ1 of the first exhaust-gas probe 114, λ2 of the second exhaust-gas probe 118, n of the speed sensor 120 and TBKM of the temperature sensor 121 are fed to a central control unit 124 via corresponding connecting lines. The control unit 124 evaluates the sensor signals and drives the injection nozzle or the injection nozzles 112 and the spark plugs 122 via further connecting lines. Furthermore, the control unit 124 carries out the method according to the present invention for forming a signal relating to a temperature in the exhaust system of the internal combustion engine 100.

Figure 2:
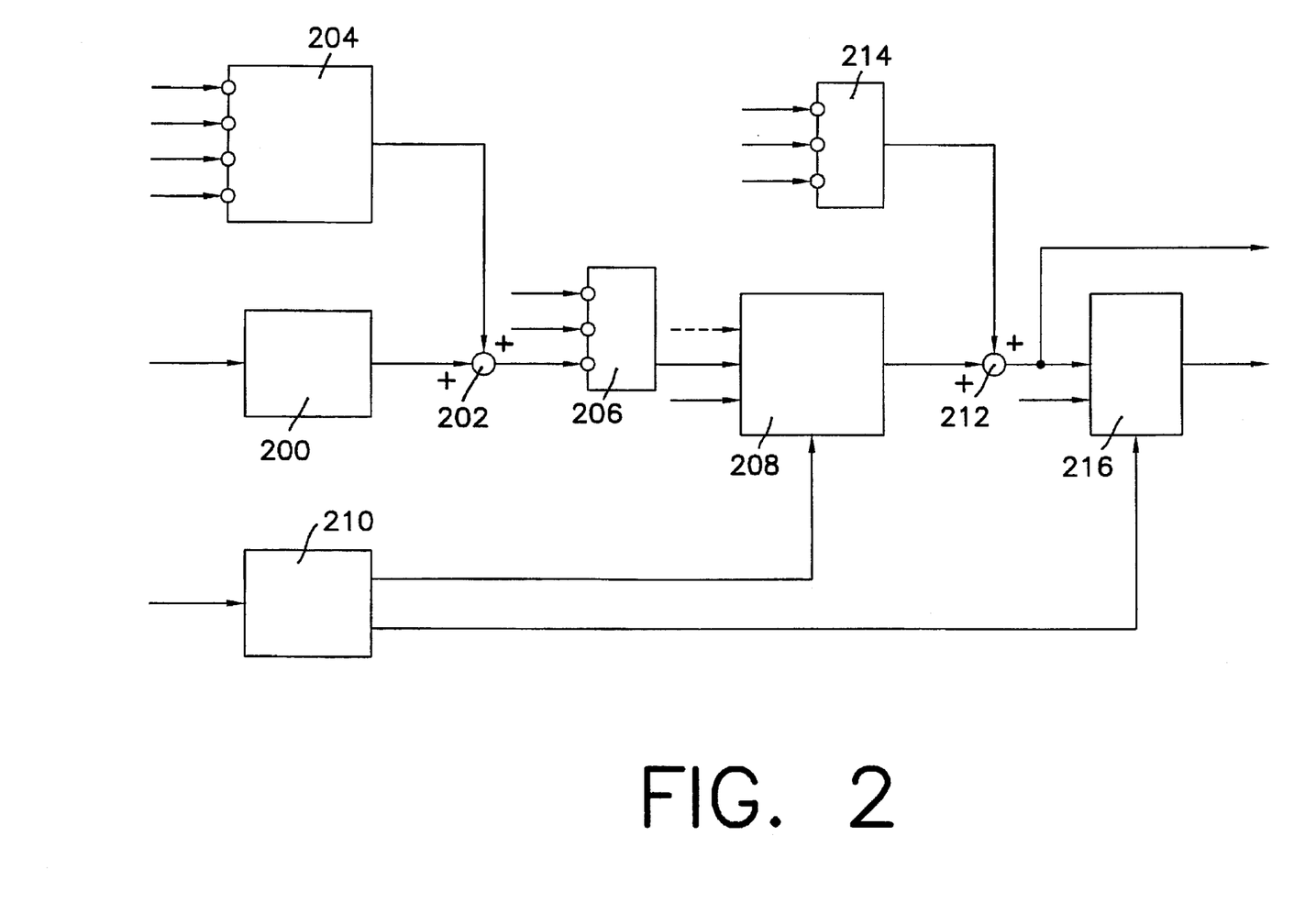
FIG. 2 shows a block diagram of a representative overview of the present invention.

FIG. 2 shows a representative overview of the present invention in the form of a block diagram. At least one signal which specifies the mixture flow rate through the internal combustion engine 100 is fed into a block 200.

This can be the signal mL which is generated by the air mass meter or air-flow sensor 106. Instead of the signal mL, it also is possible to feed into the block 200 a signal n for the speed and a signal tL for the load on the internal combustion engine 100. This also holds for other blocks in FIG. 2 into which the signal mL is fed, that is to say, the signals n and tL can be used as an alternative to the signal mL. The signal tL for the load on the internal combustion engine 100 can be determined in a known way, for example from the opening angle α of the throttle valve 108. The block 200 determines, from the signal mL or from the signals n and tL, a signal TStat for the steady-state exhaust gas temperature and provides this signal at its output.

The output of the block 200 is connected to a first input of a logic point 202. The second input of the logic point 202 is connected to the output of a correction block 204. The correction block 204 generates, as a function of the signals present at its inputs, a correction signal dTStat which is combined at the logic point 202 with the signal TStat for the steady-state exhaust gas temperature.

Figure 3:
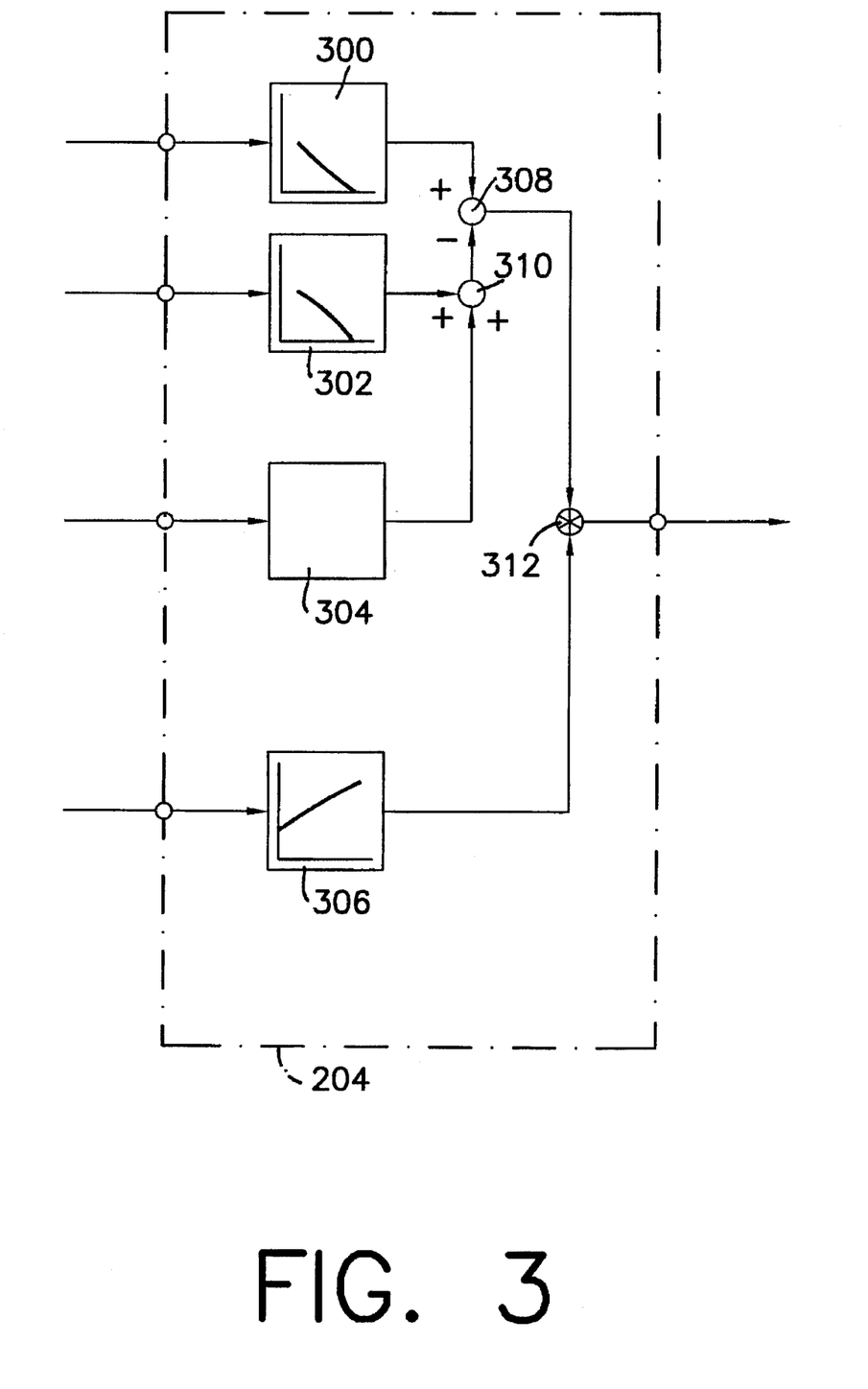
FIG. 3 shows an internal design of a first block shown in FIG. 2.

Present at the input A of the correction block 204 is a signal η which specifies the efficiency of the internal combustion engine 100. The signal η can be determined, for example, with the aid of a characteristic curve from the deviation of the actual ignition angle from an ignition angle which is optimum under the operating conditions. Present at an input B of the correction block 204 is a signal λ for the air/fuel ratio of the mixture taken in by the internal combustion engine 100. One of the signals λ1 and λ2, which are generated by the exhaust-gas probes 114 and 118, respectively, can serve as signal λ. Present at an input C of the correction block 204 is a signal TAn for the temperature of the air in the intake tract 102, which signal is generated by the temperature sensor 107. The signal mL for the air mass flow is present at one input D, or the signals n and tL for the speed and the load on the internal combustion engine 100 are present. The internal design of the correction block 204 is represented in FIG. 3 and explained in the associated text.

Provided at the output of the logic point 202 is a signal TStat1 which is generated at the logic point 202 by combining the signal TStat with the correction signal dTStat. The output of the logic point 202 is connected to an input G of a block 206. The block 206 influences the signal TStat1 as a function of the number of the cylinders cut out by the fuel metering, and provides a signal TStat2 at its output. The number of the cylinders cut out is communicated to the block 206 in the form of a signal RED which is fed into an input F of the block 206.

Figure 4:
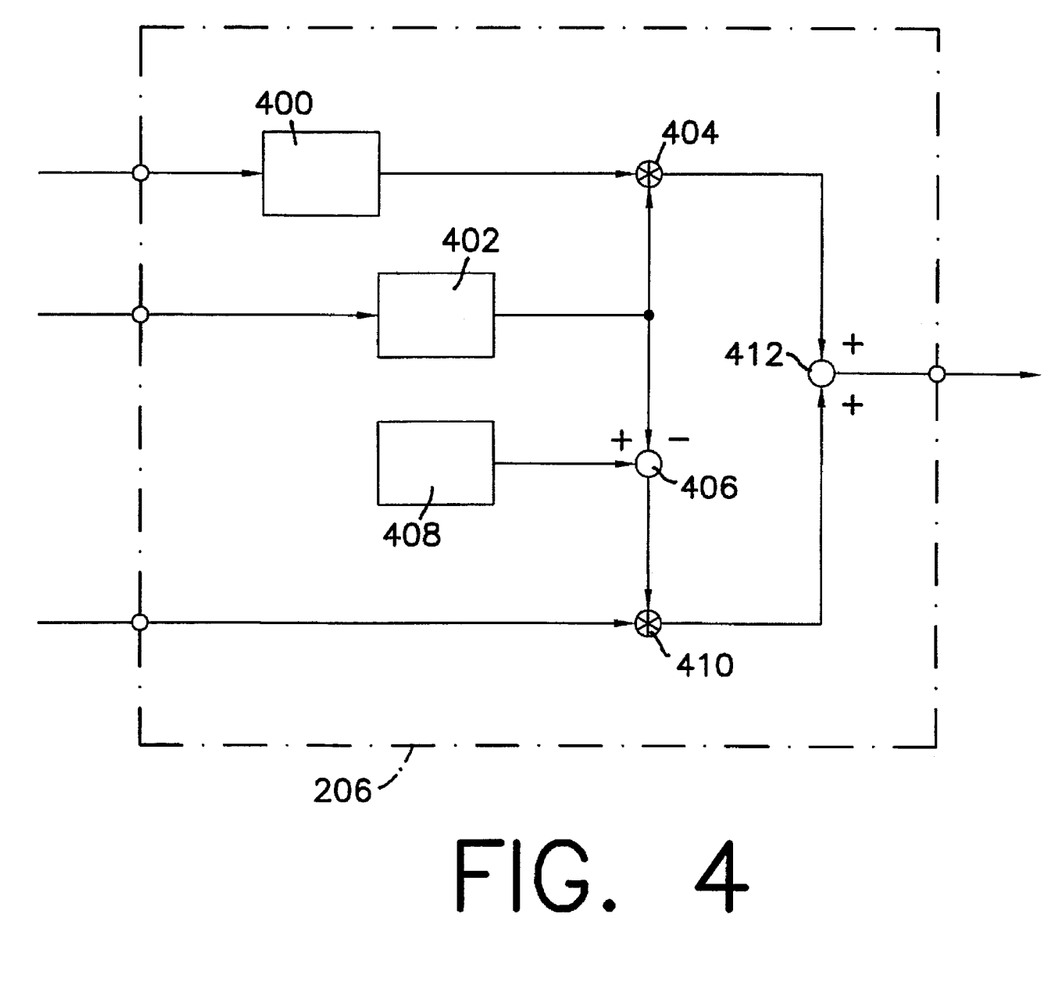
FIG. 4 shows an internal design of a second block shown in FIG. 2.

The signal RED is generated in the control unit 124 and taken into account there during driving of the injection nozzle or the injection nozzles 112, that is to say, the signal RED already is present in any case and need not be specially generated for the method according to the present invention. The signal mL for the air mass flow rate is fed into a further input E of the block 206, or the signals n and tL for the speed and the load on the internal combustion engine 100 are fed in. The internal design of the block 206 is represented in FIG. 4 and details on the method of functioning are explained in the associated text.

The output of the block 206 is connected to an input of a block 208 in which the signal TStat2 is split into a fast and a slow component. The two components are first further processed individually, and subsequently superimposed to form a signal TAbg. The signal TAbg is provided at the output of the block 208. Furthermore, a correction of the slow component can take place in the block 208 as a function of driving speed. For this purpose, it is possible to feed in, via a further input of the block 208, a signal v for the driving speed of the motor vehicle, which signal is generated, for example, by a speedometer. Via a further input, the signal mL for the air mass flow is fed into the block 208, or the signals n and tL for the speed and load on the internal combustion engine 100 are fed in. Details on the design and the method of functioning of the block 208 are described in German Patent Application No. DE 44 24 811.

A further input of the block 208 is connected to an output of a block 210. It is determined in the block 210 whether condensed water is present and at what point in the exhaust system of the internal combustion engine 100. Present in the input of the block 210 is the signal mL for the air mass flow, or the signals n and tL for the speed and load on the internal combustion engine 100 are present. The design and mode of functioning of the block 210 are described in German Patent Application No. DE 43 38 342.

The output of the block 208 is connected to a first input of a logic point 212. The second input of the logic point 212 is connected to the output of a correction block 214. The correction block 214 outputs a signal dTAbg, which represents the influence of the exothermal conversion of the exhaust gases in the catalytic converter 116 on the exhaust gas temperature. The correction block 214 has three inputs H, I and K at which the signals η, λ and RED are present, respectively. The design and method of functioning of the correction block 214 can be gathered from FIG. 5 and the associated text.

At the logic point 212, the signals TAbg and dTAbg are superimposed to form a signal TIKat, and this signal TIKat, which specifies the temperature in the catalytic converter 116, is, on the one hand, provided for further processing and, on the other hand, fed into an input of a block 216. The block 216 simulates the temperature response of the catalytic converter 116 and can, for example, be designed as a filter, in particular as a low-pass filter. The signal mL for the air mass flow is fed into a further input of the block 216, or the signals n and tL for the speed and load on the internal combustion engine 100 are fed in. A third input of the block 216 is connected to a second output of the block 210, that is to say, the block 216 is influenced via this third input as a function of whether condensed water is present in the catalytic converter 116. Provided at the output of the block 216 is a signal TKat which specifies the temperature immediately downstream of the catalytic converter 116.

The method of functioning of the block diagram represented in FIG. 2 can be summarized as follows:

The signal TStat, output by the block 200, for the steady-state exhaust gas temperature is first corrected as a function of a series of operating characteristics by superimposing the correction signal dTStat, generated by the correction block 204, on the signal TStat at the logic point 202 to form the signal TStat1. The signal TStat1 can be influenced, for example, as a function of the number of the cylinders cut out (block 206). From the signal TStat2 generated in this case, the signal TAbg for the exhaust gas temperature is generated in the block 208, taking account of dynamic effects.

The signal TIKat for the temperature in the catalytic converter 116 is produced by taking account of the heat released in the catalytic converter 116 in the form of the signal dTAbg, which is generated by the correction block 214, and which is superimposed at the logic point 212 on the signal TAbg. Finally, there is formed from the signal TIKat, by means of the block 216 which simulates the dynamic response of the catalytic converter 116 in relation to the temperature, the signal TKat which specifies the temperature immediately downstream of the catalytic converter 116.

The effect that, at the points of the exhaust system at which condensed water is present, the temperature does not rise above the dew-point temperature of the condensed water, is taken into account by means of the block 210. The block 210 drives the blocks 208 and 216 in such a way, as the case may be, that the signals TAbg and TKat respectively generated by them are limited to values which correspond to the dew-point temperature.

FIG. 3 shows a block diagram of the internal design of the correction block 204 from FIG. 2. The signal η for the efficiency of the internal combustion engine 100 is fed into the input A of the correction block 204. The input A is connected to the input of a block 300 which determines a correction value Fη from the signal η and provides it at its output.

Present at the input B of the correction block 204 is the signal λ for the air/fuel ratio of the mixture. The input B is connected to the input of a block 302 which determines a correction value Fλ from the signal λ and provides it at its output.

Present at the input C of the correction block 204 is a signal TAn for the temperature of the air taken in by the internal combustion engine 100. The input C is connected to the input of a block 304 which determines a correction value FTAn from the signal TAn and provides it at its output.

The signal mL for the air mass flow is present at the input D of the correction block 204. The input D of the correction block 204 is connected to the input of a block 306 which determines a correction value FmL from the signal mL and provides it at its output.

The correction value Fη output by the block 300 takes account of the dependence of the exhaust gas temperature on the efficiency of the internal combustion engine 100. Given a high efficiency, a larger component of the energy released during the combustion of the air/fuel mixture is converted into kinetic energy than given a low efficiency. Consequently, given a high efficiency, a smaller amount of heat is released than given a low efficiency. Accordingly, the exhaust gas temperature is lower given a high efficiency than given a low efficiency.

The output of the block 300 is connected to a first input of a logic point 308. The second input of the logic point 308 is connected to the output of a logic point 310. The first input of the logic point 310 is connected to the output of the block 302, and the second input of the logic point 310 is connected to the output of the block 304. The signals Fλ and FTAn, for example, are superimposed additively at the logic point 310 and the result of the superimposition is provided at the output of the logic point 310. The output signal of the logic point 310 is subtracted at the logic point 308 from the signal Fλ and the result of the subtraction is provided at the output of the logic point 308.

The output of the logic point 308 is connected to a first input of a logic point 312, whose second input is connected to the output of the block 306. A multiplicitive superimposition of the signal output by the logic point 308 and the signal FmL takes place at the logic point 312. The result of this superimposition is the correction signal dTStat, by means of which the signal TStat for the steady-state exhaust gas temperature is finally corrected (see FIG. 2). The output of the logic point 312 is connected to the output of the correction block 204.

Thus, overall, there are generated in the correction block 204, from a series of operating characteristics, signals which take account of the influence of the operating characteristics on the exhaust gas temperature. The generation of these signals is performed by the blocks 300, 302, 304 and 306, which can be realized, for example, as characteristic curves. The individual signals are superimposed in the way represented in FIG. 3 with the aid of the logic points 308, 310 and 312 to form the correction signal dTStat, which is provided at the output of the correction block 204.

FIG. 4 shows a block representation of the internal design of the block 206 of FIG. 2. The block 206 takes account of the influence of cutting out cylinders on the exhaust gas temperature. The input E of the block 206, at which the signal mL for the air mass flow is present, is connected to the input of a block 400. The block 400 determines from the signal mL a signal TStatA for the steady-state exhaust gas temperature under the condition that cylinder cutout is present. In other words, the signal TStatA for the steady-state exhaust gas temperature in the case of cylinder cut out is determined by the block 400 as a function of the mixture flow rate through the internal combustion engine 100. It also is possible to take account of, in addition, the temperature of the internal combustion engine 100 in the form of the signal TBKM as a further parameter in the determination of the signal TStatA. The block 400 can consequently be realized as a characteristic curve or as an engine characteristics map or as a mathematical algorithm.

The functional units of the block 206 which are described below provide the signal TStatA and the signal TStat1, which is present at the input G of the block 206, with weighting factors which are a function of the number of the cylinders cut out, and subsequently superimpose the signals on the signal TStat2. That is to say, a type of mixed temperature between the cylinders cut out and the cylinders supplied with fuel is determined.

The input F of the block 206, at which the signal RED for the cylinders cut out is present, is connected to the input of a block 402. From the signal RED, the block 402 determines a weighting factor FG which establishes how large the component of the signal TStatA is during superimposition with the signal TStat1. The weighting factor FG has a value of between 0 and 1, depending on how many cylinders are cut out.

The output of the block 402 is connected to a first input of a logic point 404 and to a first input of a logic point 406. In the logic point 404, whose second input is connected to the output of the block 400, the signal TStatA is combined with the weighting factor FG and the result of the logic operation is provided at the output of the logic point 404. The second input of the logic point 406 is connected to the output of a read-only memory 408 in which the value 1 is stored. At the logic point 406, the weighting factor FG is subtracted from the value 1 and the result of this operation is provided at the output of the logic point 406. The output of the logic point 406 is connected to a first input of a logic point 410 whose second input is connected to the input G of the block 206. At the logic point 410, the signal TStat1 is combined with the difference 1 minus FG, and the result of this logic operation is provided at the output of the logic point 410.

The output of the logic point 410 is connected to a first input of a logic point 412 whose second input is connected to the output of the logic point 404. At the logic point 412, the signals TStatA and TStat1, weighted with the weighting factors FG and the difference 1 minus FG, respectively, are superimposed. The result of this superimposition is provided at the output of the logic point 412 as the signal TStat2. The output of the logic point 412 is connected to the output of the block 206.

Figure 5:
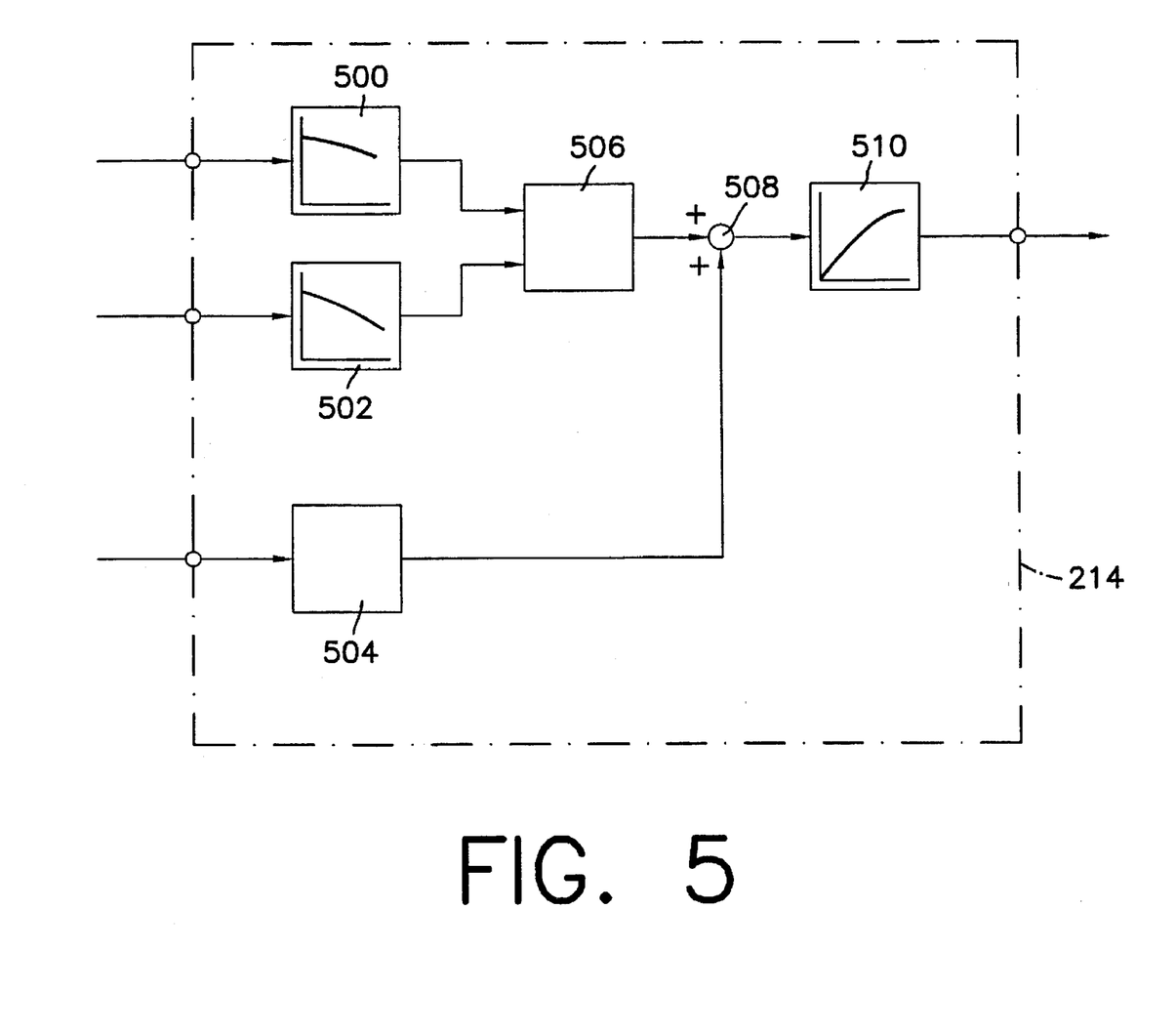
FIG. 5 shows an internal design of a third block shown in FIG. 2.

FIG. 5 shows a block diagram of the internal design of the correction block 214 from FIG. 2. The correction block 214 takes account of the influence of the exothermal conversion of the exhaust gases in the catalytic converter 116 on the exhaust gas temperature. The exothermal conversion is a function of a series of operating characteristics which are taken into account by the correction block 214 in the form of the signals $\eta, \lambda$ and RED.

The input H of the block 214 at which the signal $\eta$ for the efficiency of the internal combustion engine 100 is present is connected to the input of a block 500. The block 500 determines the correction signal TE$\eta$ from the signal $\eta$ and provides it at its output. The input I of the correction block 214, at which the signal $\lambda$ for the air/fuel ratio is present, is connected to the input of a block 502. The block 502 determines a correction signal TE$\lambda$ from the signal $\lambda$ and provides it at its output. The input R of the correction block 214, at which the signal RED for the cylinder cutout is present, is connected to the input of a block 504. The block 504 determines a correction signal TERED from the signal RED and provides it at its output.

The output of the block 500 and the output of the block 502 are connected to one input each of a block 506. The block 506 forms the minimum of the two correction signals TE$\eta$ and TE$\lambda$ and provides the signal thus generated at its output. The output of the block 506 is connected to a first input of a logic point 508 whose second input is connected to the output of the block 504. The logic point 508 superimposes the output signal of the block 506 and the signal TERED and provides the result of the superimposition at its output. The output of the logic point 508 is connected to the input of a block 510. The block 510 is designed as a filter. It filters the output signal of the logic point 508 and relays the filtered signal dTAbg to the output of the correction block 214.

The operation of the correction block 214 can be summarized as follows:

The blocks 500 and 502 generate from the input signals $\eta$ and $\lambda$ the correction signals TE$\eta$ and TE$\lambda$, from which the block 506 selects the minimum. This minimum is additively superimposed at the logic point 508 with the correction signal TERED, which is determined by a block 504 from the signal RED. Finally, the correction signal dTAbg for the exhaust gas temperature is generated from the result of the superimposition by filtering in the block 510. The blocks 500, 502, and 504, which generate the correction signals, can be realized as characteristic curves or, as an alternative to this, represent functional blocks which each contain a suitable algorithm.

Figure 6:
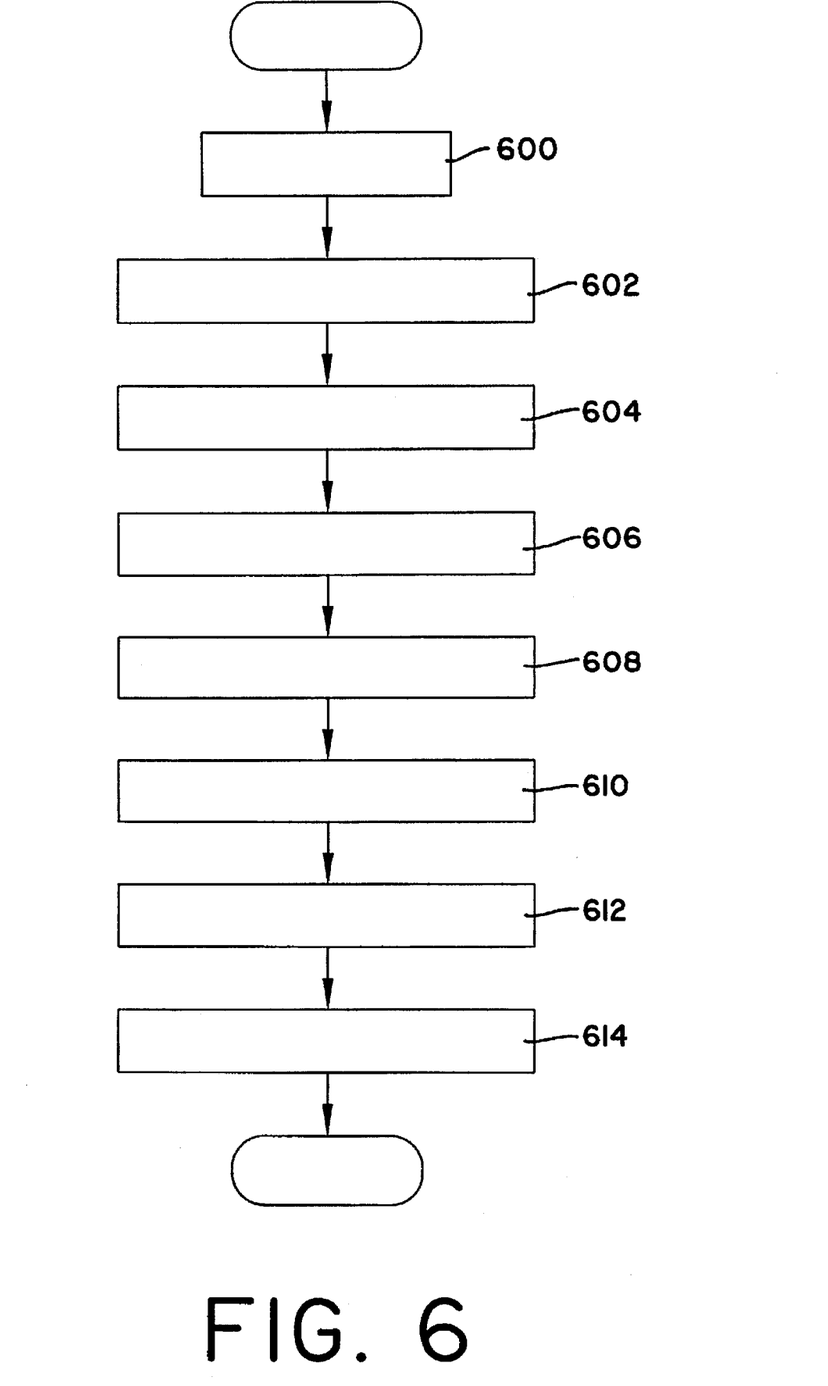
FIG. 6 illustrates a flow diagram of the method according to the present invention.

FIG. 6 illustrates a flow diagram of the method according to the present invention. The signal TStat for the steady-state exhaust gas temperature is generated in a first step 600. This step is carried out by the block 200 from FIG. 2. Step 600 is followed by a step 602 in which the correction signal dTStat is generated from a series of operating characteristics which are represented in the represented exemplary embodiment by the signals $\eta, \lambda$, TAn and mL. Step 602 is carried out by the block 204 from FIG. 2. Step 602 is followed by a step 604 in which the signals TStat and dTStat are added to the signal TStat1. The addition takes place at the logic point 202 of FIG. 2.

A step 606 follows step 604. In step 606, a signal TStat2 is formed from the signals TStat1, RED and mL with the aid of the block 206 from FIG. 2. There then follows step 608, which determines a signal TAbg for the exhaust gas temperature from the previously determined signal TStat2 and the signals v and mL. Step 608 is carried out with the aid of the block 208 from FIG. 2, it being taken into account whether the block 210, represented likewise in FIG. 2, reports the presence of condensed water. Step 608 is followed by a step 610. In step 610, the signal dTAbg is formed as a function of operating characteristics which are represented by the signals $\eta, \lambda$ and RED. The generation of the signal dTAbg is performed by means of the block 214 from FIG. 2.

Step 610 is followed by a step 612 in which the signal dTAbg determined in step 610 is added to the signal TAbg and the signal TIKat is formed. The addition takes place at the logic point 212 of FIG. 2. Following step 612 is a step 614, in which the signal TKat is determined as a function of the signals TIKat and mL. Step 614 is carried out with the aid of the block 216 from FIG. 2. In a manner similar to step 608, it also is taken into account in step 614 whether the block 210 reports condensed water. The run through the flow diagram is terminated with step 614.

A series of further variants are possible within the scope of the method according to the present invention in addition to the exemplary embodiments already outlined. In particular, depending on which temperature in the exhaust system is to be simulated with which accuracy, one block, or even a plurality of blocks, of the block diagram represented in FIG. 2 can be eliminated. For example, the correction block 214 can be eliminated if only one signal TAbg is to be generated for the exhaust gas temperature upstream of the catalytic converter 116. Or, if the influence of the exothermal conversion on the temperature in the catalytic converter 116 (signal TIKat) or on the temperature downstream of the catalytic converter (signal TKat) can be neglected, the correction block 214 also can be eliminated. The block 206 also can be eliminated if the influence of the cylinder cutout can be neglected or if no cylinder cutout is provided at all.

In addition, a first correction signal may also be determined as a function of the efficiency signal, the intake air signal, an air/fuel ratio signal indicative of an air/fuel ratio of a mixture fed into the internal combustion engine and a flow rate signal indicative of a mixture flow rate through the internal combustion engine.

What is claimed is:

1. A method for generating at least one temperature signal indicative of a temperature in an exhaust system of an internal combustion engine, comprising the steps of:

forming a steady state temperature signal indicative of a steady-state exhaust gas temperature, the steady-state signal being determined as a function of at least one operating characteristic of the internal combustion engine;

forming a first correction signal indicative of a correction factor, the first correction signal being determined as a function of at least one of an efficiency signal indicative of an efficiency of the internal combustion engine and an intake-air signal indicative of an air temperature of air entering the internal combustion engine; and forming a first temperature signal indicative of the temperature in the exhaust system as a function of at least the steady-state signal and the first correction signal.

2. The method according to claim 1, wherein the first correction signal is also determined as a function of one of an air/fuel ratio signal indicative of an air/fuel ratio of a mixture fed into the internal combustion engine and a flow rate signal indicative of a mixture flow rate through the internal combustion engine.

3. The method according to claim 1, wherein the first correction signal is determined as a function of the efficiency signal, the intake air signal, an air/fuel ratio signal indicative of an air/fuel ratio of a mixture fed into the internal combustion engine and a flow rate signal indicative of a mixture flow rate through the internal combustion engine.

4. The method according to claim 1, wherein the step of forming the first temperature signal includes forming the first temperature signal as a function of the steady state temperature signal, the first correction signal, and a cylinder cut out signal indicative of a number of cut out cylinders of the internal combustion engine.

5. The method according to claim 1, further comprising the steps of:

forming a cut out temperature signal indicative of a steady-state exhaust gas temperature when at least one cylinder of the internal combustion engine is cut out;

weighting the cut out temperature signal as a function of the number of cut out cylinders of the internal combustion engine;

wherein the first temperature signal is also a function of the weighted cut out temperature signal.

6. The method according to claim 1, further comprising the step of forming an upstream temperature signal indicative of a temperature of a portion of the exhaust system upstream of a catalytic converter of the internal combustion engine, the upstream temperature signal being determined as a function of at least the steady state temperature signal.

7. The method according to claim 6, further comprising the steps of:

forming a second correction signal indicative of a second correction factor, the second correction signal being determined as a function of the efficiency signal, an air/fuel ratio signal indicative of an air/fuel mixture fed into the internal combustion engine, and a cylinder cut out signal indicative of a number of cut out cylinders of the internal combustion engine; and forming a catalytic converter signal indicative of a temperature in the catalytic converter, the catalytic converter signal being determined as a function of the upstream temperature signal and the second correction signal.

8. The method according to claim 7, further comprising the steps of:

filtering the catalytic converter signal; and forming a downstream temperature signal indicative of a temperature in the exhaust system downstream of the catalytic converter as a function of the filtered catalytic converter signal.

9. A device for forming at least one temperature signal of a temperature in an exhaust system of an internal combustion engine, comprising:

first means for forming a steady state temperature signal indicative of a steady-state exhaust gas temperature, the steady state temperature signal being determined as a function of at least one operating characteristic of the internal combustion engine;

second means for forming a correction signal indicative of a correction factor, the correction signal being determined as a function of at least one of an efficiency signal indicative of an efficiency of the internal combustion engine and an intake air temperature signal indicative of an air temperature of air entering the internal combustion engine; and third means, coupled to the first means and to the second means, for forming a first temperature signal indicative of the temperature in the exhaust system as a function of the steady state temperature signal and the correction signal.

* * * * *